(No Model.) 4 Sheets—Sheet 1.

H. L. REYNOLDS & H. W. KETCHUM.
WINDING ENGINE.

No. 519,619. Patented May 8, 1894.

Fig. 1.

Witnesses
S. T. Kelsey Jr.
D. C. Kennedy.

Inventors.
Henry L. Reynolds.
Henry W. Ketchum.

(No Model.) 4 Sheets—Sheet 2.

H. L. REYNOLDS & H. W. KETCHUM.
WINDING ENGINE.

No. 519,619. Patented May 8, 1894.

Witnesses.
S. T. Kelsey Jr.
D. C. Kennedy.

Inventors.
Henry L. Reynolds.
Henry W. Ketchum (No Model.) 4 Sheets—Sheet 3.

H. L. REYNOLDS & H. W. KETCHUM.
WINDING ENGINE.

No. 519,619. Patented May 8, 1894.

Witnesses.
S. F. Kelsey Jr.
D. C. Kennedy.

Inventors.
Henry L. Reynolds.
Henry W. Ketchum.

(No Model.) 4 Sheets—Sheet 4.

H. L. REYNOLDS & H. W. KETCHUM.
WINDING ENGINE.

No. 519,619. Patented May 8, 1894.

Witnesses.
L. T. Kelsey Jr.
D. C. Kennedy.

Inventors.
Henry L. Reynolds.
Henry W. Ketchum

UNITED STATES PATENT OFFICE.

HENRY L. REYNOLDS AND HENRY W. KETCHUM, OF SEATTLE, WASHINGTON.

WINDING-ENGINE.

SPECIFICATION forming part of Letters Patent No. 519,619, dated May 8, 1894.

Application filed January 12, 1894. Serial No. 496,636. (No model.)

*To all whom it may concern:*

Be it known that we, HENRY L. REYNOLDS, a citizen of the United States, and HENRY W. KETCHUM, a subject of the Queen of Great Britain, residing at Seattle, in the county of King and State of Washington, have invented certain new and useful Improvements in Winding-Engines; and we do hereby declare the following to be a full, clear, and exact description of the invention, such as will enable others skilled in the art to which it appertains to make and use the same.

Our invention relates to a winding or hauling engine which is adapted to a large variety of uses where a wire cable or a rope is used for hauling or hoisting, but is more especially designed to be used in connection with logging operations. With some modifications which would be evident to any mechanic it might be operated with a chain, but this is not shown as it is thought it will not be desirable to so operate it.

It consists essentially of a couple of grooved winding drums which are operated by any suitable connection from an engine or a pair of engines, and around which the rope or cable is wrapped several times to secure the requisite friction for holding and turning the cable thereon, and a storage drum independent thereof and operated by means capable of rotating it at variable speeds so proportioned as to take up the cable as fast as it is drawn in by the winding drum whether winding at the bottom of the storing drum or near its edge. This storing drum is also adapted to give a certain initial tension to the cable so as to make it grip the winding drums and secure sufficient friction thereon. A secondary overhauling drum is operated by a friction device and carries a smaller cable. The main object of this is to carry back the main or hauling line ready for a new load after a load has been brought in. It has also a reversing device whereby the direction of motion of the drums is changed without reversing the engines; also certain other devices which contribute to the effectiveness and certain operation of the machine as a whole; all of which is more fully hereinafter described.

Similar letters of reference refer to the similar parts in the different figures, in which—

In hauling logs upon the Pacific coast the methods heretofore used in other sections have been found entirely inadequate and ill adapted to the work on account of the extreme size of most of the logs and the different conditions under which the work must be done. The employment of steam machinery for this purpose has been attempted, but the machinery not having been especially designed for this work is neither powerful enough, convenient to handle, nor suited to the requirements. Our machine is designed to overcome these defects and to make a machine which shall have sufficient power to handle the largest logs, to be convenient to handle and well adapted to all the different uses apt to be required of it.

Figure 1:
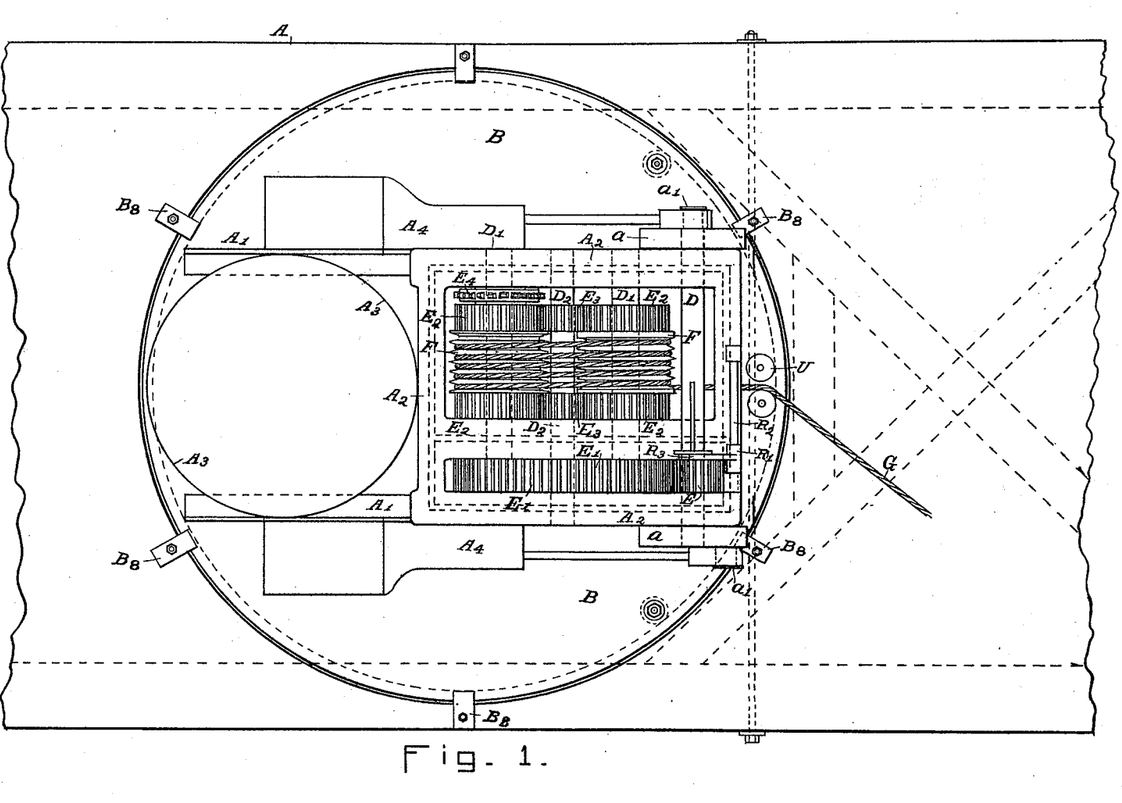
Figure 1, is a plan view showing the sled upon which it would be mounted when used for hauling logs. In this view everything above the winding drums is removed.
Figures 2, 3, 9, 10, 11, 12, 13:
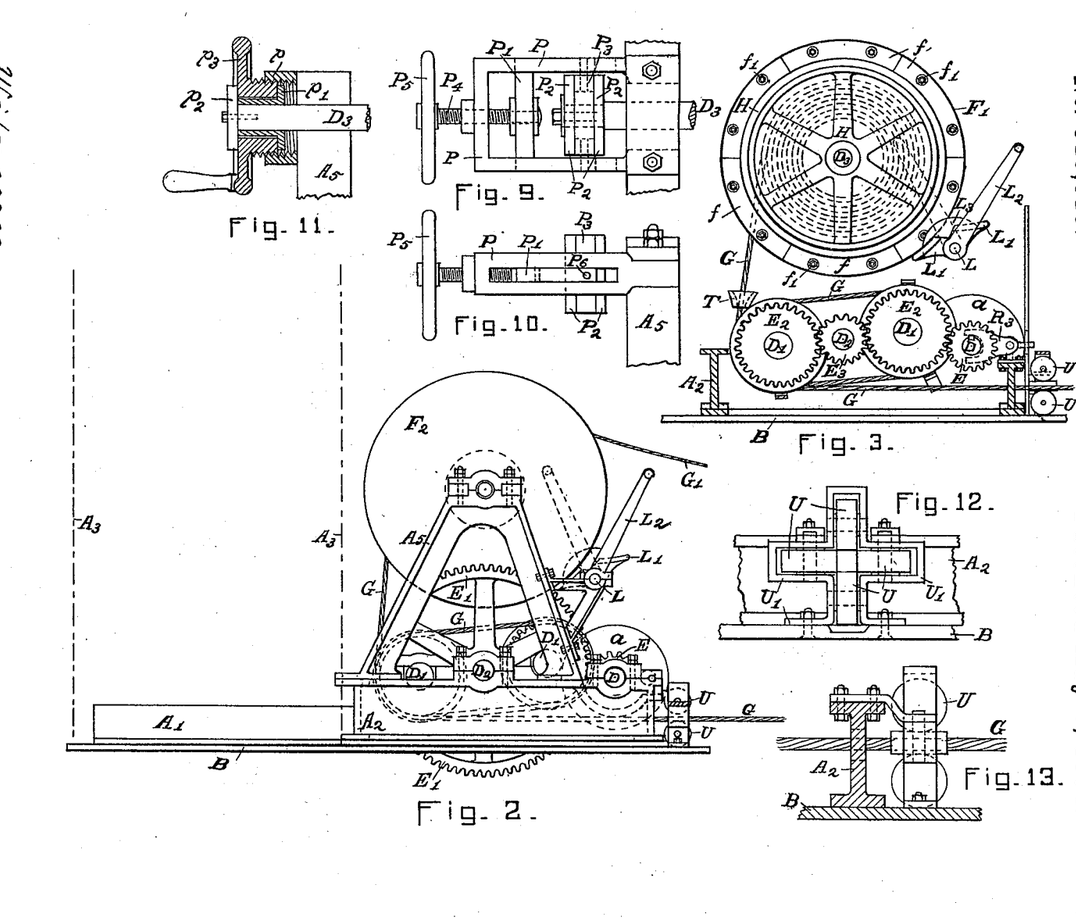
Fig. 2 is an elevation of the mechanism from the right side, or the side which is down in Fig. 1, the engines for operating it not being shown and the position of the boiler being indicated by dotted lines.
Fig. 3, is an elevation partly in section showing the winding and storing drums, friction wheel, &c., the mechanism in front of the same having been removed and the boiler omitted entirely.
Figs. 9 and 10 are plan and elevation of the mechanism for shifting the friction wheel and putting it on either the storing or overhauling drums.
Fig. 11, is a sectional view of another mechanism for accomplishing the same purpose.
Figs. 12 and 13, are front and side elevations of the pulleys for guiding the hauling cable upon the winding drums when hauling.
Figures 4, 7, 8:
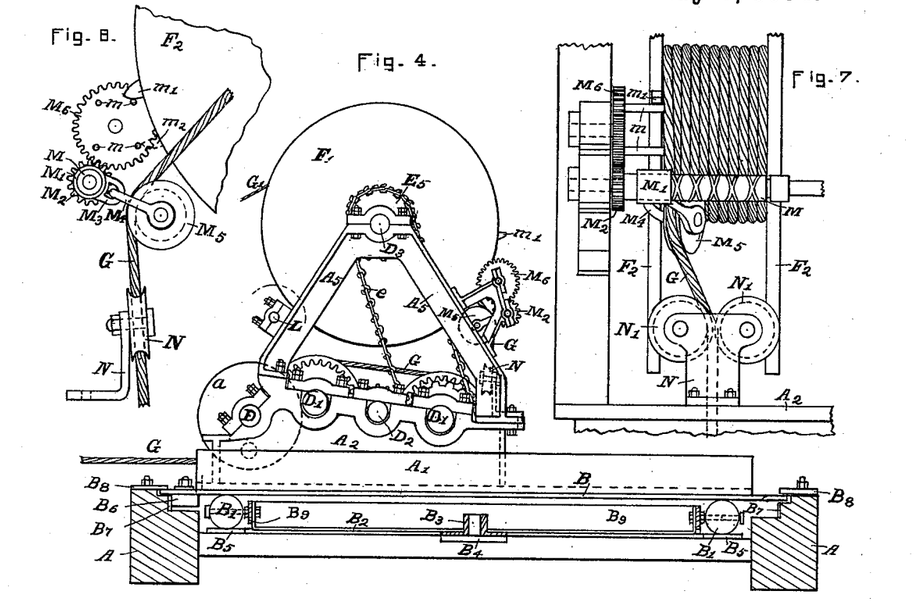
Fig. 4, is an elevation from the opposite side of Fig. 2, the engines and boiler being removed. This also shows a section of the sled and turntable.
Figs. 7 and 8, are detail elevations taken from the rear and side showing the mechanism used to guide the rope between the storing drum and the winding drums.
Figure 6:
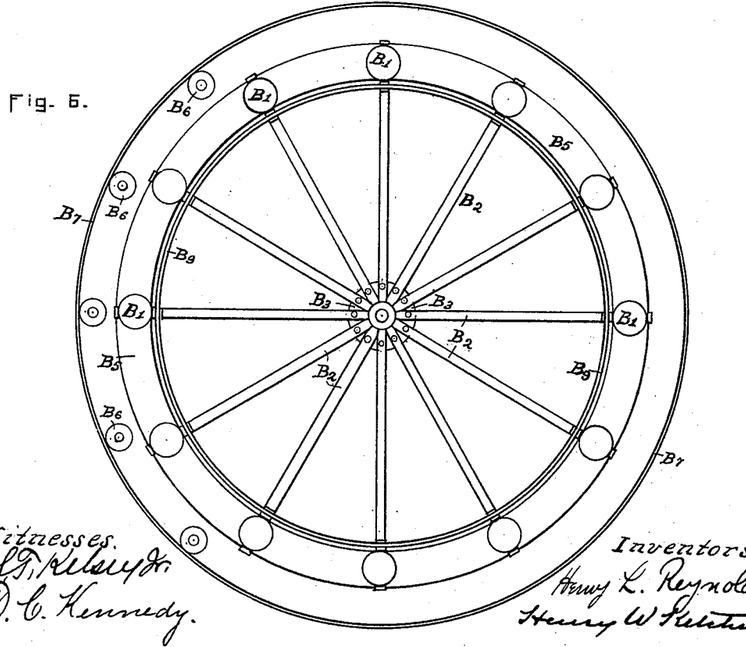
Fig. 6, is a plan view of the turntable.

To enable the machine to be readily moved from place to place it is mounted upon a sled. This consists essentially of a heavy timber A, A, upon each side thoroughly braced together and floored on top. These are sloped at each end so that they may slide over the skids upon which the logs are hauled. To enable the machine to work in any direction from this sled, it is mounted upon a turntable so that it can be faced in any direction. This turntable can be made in numerous ways, but, as shown in Figs. 4 and 6, consists of a circular iron plate B which forms the foundation of the boiler and machinery, mounted upon balls B'. These balls run upon iron plates above and below. The lower plate $B^5$ is a ring, while the upper is the plate B forming the top of the turntable. The balls B', are carried upon arms $B^2$, which are attached at their centers to the plate $B^3$. This has a central hole fitting over a pin upon the plate $B^4$, which is fixed centrally to the lower floor of the turntable. This construction secures easy turning, which although not always necessary is sometimes desirable. To take the strain of the pull of the cable a number of small rollers $B^6$, are pivoted to the under side of the turntable. These are placed on the front side of the turntable, or on that side from which the pull comes, and roll upon an iron ring $B^7$, which is let into the upper surface of the sled, and is well backed up by the framing of the sled. These rollers may be continued around the circle if thought desirable, but it is not necessary. To prevent the turntable from lifting out, and also to lock it in any position desired a number of short bars or buttons $B^8$, are placed about it. These are plain flat bars each having a hole which fits over a bolt fixed in the frame of the sled. Upon the top of the turntable are placed the two angle irons A', A', having their horizontal flanges turned toward each other, which stiffen the turntable and support the boiler and machinery. The cast iron frame $A^2$, of the winding mechanism fits between these angle irons, resting upon the horizontal flanges. It is secured thereto by bolting. The boiler, whose location is represented by the circle $A^3$ in Fig. 1, and by the dotted lines $A^3$, in Fig. 2, also sits between the angle bars, resting upon their horizontal flanges. Mounted upon the frame $A^2$ is the engine shaft D. This has a crank disk upon each end and has an engine connected to each. As the engines form no part of our invention we have only outlined them and their location in Fig. 1. The crank disks are shown in Figs. 2, 3, and 4. To avoid confusing the drawings the engines have, except in Fig. 1, been entirely omitted. Upon this shaft D, is the pinion E, which meshes with the large gear or bull wheel E', upon the shaft $D^2$. Pinions $E^3$, upon this shaft gear with the gears $E^2$, upon the shafts D', of the winding drums F, F. These winding drums F, F, have a number of grooves running around them designed to receive the main or hauling cable G. This comes from the front of the machine, passes under the front drum and into the first groove of the rear winding drum. It then passes around the two drums in the manner most clearly seen in Figs. 1 and 3. The friction of the cable in the grooves due to the number of turns is relied upon to give sufficient friction to prevent any slipping.

The frame $A^5$, mounted upon the frame $A^2$, supports the storing drum F', and the overhauling drum $F^2$. The storing drum is mounted directly over the side of the winding drums from which the cable leaves them when they are hauling in. This drum is mounted loosely upon the shaft $D^3$, and is rotated by the friction wheel H, which is keyed to the shaft. The shaft is rotated by the chain $e$, and the sprocket wheels $E^4$, and $E^5$, upon the shafts D' and $D^3$. The sprocket wheel $E^5$ is fastened to the shaft $D^3$, by a key and feather so that the shaft will be rotated thereby, but may slide endwise without moving the wheel from its place. The overhauling drum $F^2$, is also mounted loosely upon the same shaft. Upon the face of each of these drums which are next to the friction wheel H, is fixed a series of segmental wooden blocks $f$. These friction blocks are at the outer edge of the flange of the drum and secured thereto by bolts $f'$, so that they may be easily and quickly replaced when worn. The storing drum is prevented from moving endwise by the sprocket wheel $E^5$, and the flanged collar $L^3$ upon the brake shaft L. The over hauling drum is prevented from endwise movement by the collar $f^2$ on the drum shaft and a flanged collar $L^3$, on the brake shaft. Now when the shaft $D^3$ is moved endwise it carries the friction wheel with it, and engages one or the other of the drums, rotating it by frictional contact.

Figures 15, 16, 17, 18:
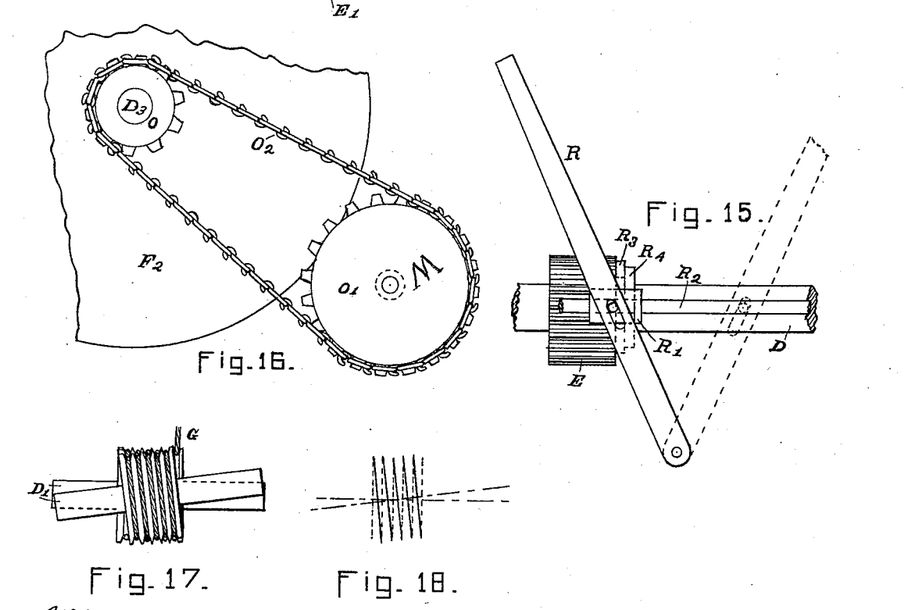
Fig. 15, is an elevation of the mechanism for shifting the pinion on the engine shaft whereby the direction of the motion of the drums is reversed.
Fig. 16, is a detail of another method of operating the cable guiding and laying mechanism shown in Figs. 7 and 8.
Fig. 17, is a front elevation of two winding drums arranged so that there is no side lead between the drums.
Fig. 18, is a diagram illustrating the motion of the cable on such drums.

The sprocket wheels by which the drum shaft $D^3$ is rotated from one of the winding drum shafts are so proportioned, that, were there no slipping of the friction driving device, the rotation of the storing drum would be slightly faster than the winding drum. The center of the storing drum is made the same size as the winding drums. The result is that the storing drum will always run at a sufficient speed to insure taking up all the slack promptly. As the storing drum cannot wind up the cable any faster than the winding drums deliver it, the frictional driving device will slip, but will always keep the cable taut. The amount of the strain on the cable can be regulated by the pressure on the frictional device. Ordinarily this will only be sufficient to secure promptly taking up the slack. In this manner the rotation of the drum at the varying rates of speed necessitated by the winding at the bottom or outer edge of the drum is secured. By using separate winding and storing drums in this way a number of disadvantages inherent in the use of a single drum are obviated. In the first place, a large amount of cable can be used without having either large drums or winding the cable upon itself while under strain. The use of large drums would make the machine very much heavier as well as larger and would both increase the cost and make it much more unwieldy to handle. The use of a smaller drum and winding the cable upon itself causes a constant variation of both the power and speed, making the power less and the speed greater as the size of the coil increases. Moreover the cable being under strain cuts down into the previous coils, wedging and jamming between the ends of the drum and injuring the cable. In using grooved drums where the strain comes on the cable, the grooves can be made the size and shape of the cable and will support it throughout the under half of its circumference and the cable will not be distorted and pressed out of shape, as will happen when winding on a flat drum or with the coils piled on top of each other. A cable used in this way lasts a much shorter time than it would when used on our machine. To insure the smooth and regular coiling of the cable on the storing drum we have put on a rope controlling, or laying device. This is shown in Figs. 7 and 8. It consists essentially of a cylinder M, having two spiral grooves or threads cut upon it in opposite directions and crossing each other. At each end of the cylinder these threads or grooves are united to each other by a straight portion which has no pitch. Surrounding this and sliding thereon is a collar M', which has a shuttle pivoted thereto and running in the grooves in the cylinder M. This is the well known device by which a continuous rotary motion of the cylinder is converted into a reciprocating motion of the collar or nut. The collar has an eye $M^3$ on one side in which is the clevis $M^4$, which carries the wheel $M^5$. This wheel carries and guides the cable. It has been mounted in a clevis in the way described so that under the pull of the cable it will pull into such a position that the lead of the cable upon it will always be true, and there will not be a tendency to pull or ride over the edge of the pulley, as would be the case were it fixed firmly in one position. The cylinder M, is rotated in the following manner:—A small pinion $M^2$ is keyed to one end and meshes with the gear $M^6$. This gear is twice the diameter of the pinion and has four pins $m$, projecting from one face just across the face of one flange of the storing drum. Upon this flange or rim of the storing drum $F^2$ is a projection $m'$, which at each revolution of the drum engages one of the pins $m$, turning the wheel, $M^6$ one quarter of a revolution. As the cylinder M is laid out so as to advance the wheel $M^5$ the width of the cable for half a turn, the wheel $M^5$, is thus advanced the width of the cable for a quarter turn of the wheel $M^6$, or for each turn of the drum $F^2$. Another method of operating this cylinder is shown in Fig. 16. In this a sprocket wheel O, on the storing drum $F^2$, is connected by the chain $O^2$, with a sprocket wheel O', of twice the diameter, on the cylinder M. This secures a steady motion of the wheel $M^5$ while the other device makes an intermittent motion. Either device will reverse with the reversal of the drum.

To insure the proper lead of the cable from the storing drum upon the winding drums when running out, two pulleys N' are mounted in the supporting bracket N, on the main frame with their edges close together so that the cable cannot get out. These are placed directly over the last groove in the winding drums occupied by the cable.

To move the drum shaft $D^3$ endwise, as will be necessary in operating the frictions, we have provided the device shown in Figs. 9 and 10. This consists of the yoke P, which is fixed to the frame $A^5$ and has slots in each arm in which slides the other yoke P'. This yoke P' is U-shaped and at the end of each arm engages a pin $P^6$ upon the ring $P^3$. This ring is upon a spool $P^2$ which is secured to and rotates with the drum shaft $D^3$. The yoke P' is connected by a swivel to the screw $P^4$ which works in a nut in the yoke P, and has a wheel or lever $P^5$ upon its outer end for operating it. This screw may be of steep enough pitch so that half a turn will move the friction wheel from engagement with one drum to engagement with the other, in which case a weight on the outer end may be relied upon to produce the friction desired. This can be regulated in amount by moving the weight to or from the center. A slightly different modification of this device is shown in Fig. 11. In this, a circular collar $p$, threaded on the inside is secured to the frame concentric of the shaft $D^3$. A collar or spool having two flanges, $p'$ and $p^2$, is secured to the shaft. Between these flanges is the hub of the wheel $p^3$, which has its outer surface threaded to fit the threads in the circular collar $p$.

The overhauling drum $F^2$ carries a much smaller cable than that used for hauling. The use intended for this is to pull back the main cable to the point from which the load is hauled. To do this the overhauling cable G' is carried out to this point, passed around a sheave and brought back to the machine. Now if the machine is run backward and the friction put on the overhauling drum, the small or overhauling cable will be wound up and the large cable carried out. In bringing back a load by the main cable the small cable will be attached and be ready to take back the main cable for another load. This does away with the necessity for using a team for this purpose.

Figures 5, 14:
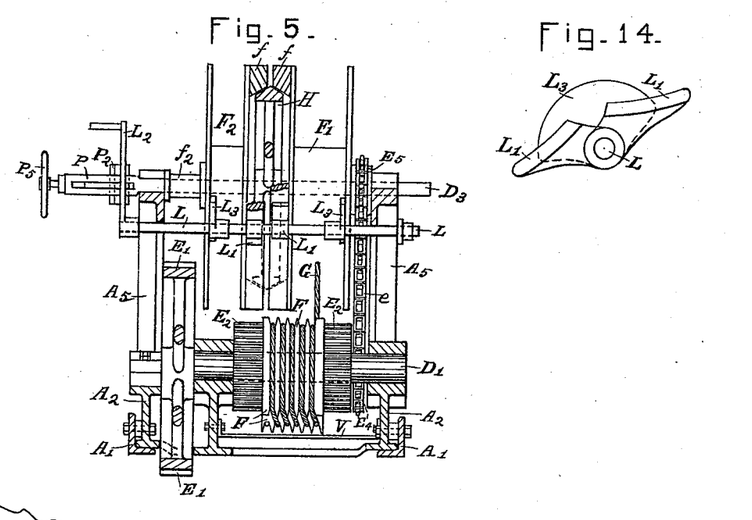
Fig. 5, is an elevation partly in section from the front.
Fig. 14 is a detail showing the brake shoes and one of the flanged collars for holding the drums out of engagement with the friction.

To be able to control the overhauling and storing drums when they are running backward, we have put a brake on each. This is shown in Figs. 2, 3 and 5, and a detail of the brake shoes in Fig. 14. A shaft L extends across the face of both drums and is supported from the frame A⁵. Upon this shaft opposite the wooden friction blocks $f$, of each drum, are placed the shoes L'. A handle L² is provided upon one end of the shaft for operating them. These shoes engage with the outer surface of the friction blocks, and are so placed that only one is in engagement at a time, and that the operating lever is moved one way for engaging one and in the opposite way for engaging the other. It will not be necessary to have the brake on either drum except when the cable on that drum is running out.

The direction of rotation of the drums is changed by shifting the pinion E, on the engine shaft, which is keyed to the shaft so that it may be slid thereon, from engagement with the large gear or bull wheel E', to engagement with the gear E² on one of the winding drum shafts. This, besides changing the direction of rotation, increases the rapidity of the motion, which results in the line being hauled back or unwound over four times as fast as it was wound in, which gives a fast speed when the load is light and a slow speed and great power when the load is heavy. The ability to reverse the motion in this way would be of advantage even if a team were used for hauling back the cable, as it would take the friction of the machinery off the load to be hauled. The pinion E is moved by the lever R, pivoted at its lower end to the frame and engaging by a slot, a pin upon the sliding collar R', which is mounted upon bar R². This collar has a forked plate which partially encircles and fits into a groove in an extension, R³, of the pinion. This pinion and the gears E' and E² are made and so placed that the pinion will engage and properly mesh with each. The overhauling drum can also be so regulated by the brake as to more thoroughly control the log in many places as for instance in pulling down a hill where there are places in which the log if permitted would slide of its own weight. If it were permitted to do this it would be likely to stop in such a position, either behind a tree or stump, or with its end in the ground, so that it would be difficult to get it out again. In such places the brake enables the log to be kept thoroughly under control.

The use of a small cable for hauling back the main cable also enables hauling to be done over swampy or rough ground over which it would be impossible to drive a team for carrying back the main cable.

The flanged collars L³, placed upon the brake shaft, press against one side of the flange of the drums F' and F² and prevent them from being moved toward the friction wheel.

To insure a proper lead of the line upon the winding drums and to avoid wearing of the line the four pulleys U, shown in detail in Figs. 12 and 13, are mounted upon the forward part of the frame so that the opening between the faces of the pulleys will be in line with the first groove on the winding drum. As the cable must first pass upon the rear of the two winding drums, the shaft of the forward drum is raised enough so that the cable will entirely clear it. The shafts of these two drums may be placed parallel to each other, in which case the groove in one should be opposite the flange in the other as shown in Fig. 1, or the shaft of one tilted sufficiently, as shown in Fig. 17, so that the grooves in each will be exactly opposite, the tilting being just enough so that in the diameter of the drum the cable will be carried sidewise just the distance between the grooves. The diagram, Fig. 18, shows the course of the cable, the dotted lines showing in elevation the cable passing over one drum and the solid lines the cable passing over the other drum.

Our machine may be mounted upon a sled for use on a skid road, or upon a scow for use in driving rivers. In use on a river, when logs are found on the bank or stuck on a bar, the scow would be tied up to the bank or an anchor dropped if that would be sufficient, and the logs pulled off into deep water. At a jam the small line G' would be carried ashore and across the jam, where a sheave would be fastened and the small cable carried back to the scow. The main cable G would then be carried out and attached to a log and the log pulled into deep water. The attachment to the log may be made in such a way that a backward pull on the small cable G' will loosen the log. As soon as the log gets into deep water it can be cast loose to go down stream, and the cable carried back, where it can be made fast to another log. In this way a jam can be rapidly broken up with the least possible manual labor, everything except the attaching of the cable to the logs being done by machinery. The machine may also be used as a pile driver engine by casting the main line off the winding drums and using the overhauling drum for hoisting the hammer. We have not shown anything upon the overhauling drum to guide the cable regularly thereon, but the same device as that shown on the main storing drum may be used if thought desirable. Instead of using the two cables, and hauling the main cable back by the little cable, the machine may be used as an endless cable machine, the cable being passed around the winding drums only.

Although we have herein described our machine as especially designed for logging, it is adapted to many other uses. It may be used as a tail rope engine for hauling on slopes in mines, for hoisting in shafts, for pulling out stumps and for various other purposes in which a cable is used for applying the power.

Having thus described our invention, what we claim, and desire to secure by Letters Patent, is—

1. In a winding engine, the combination with the cable winding mechanism, of a separate drum adapted to receive and store the cable as it is wound up, and means for rotating it, substantially as shown and described.

2. In a winding engine, the combination with the cable winding mechanism, of a separate drum adapted to receive and store the cable as it is wound up, and means for rotating it at a variable speed so that it will promptly take up the slack whether winding at the center or outer edge of the drum, substantially as shown and described.

3. In a winding engine, the combination with the two winding drums having grooves upon their circumferences adapted to receive several coils of cable, of a storing drum for receiving and storing the cable as it comes from the winding drums, and means for turning the said drums, substantially as shown and described.

4. In a winding engine, the combination with two winding drums, having grooves upon their surfaces, the axes of said drums being tipped with relation to each other so that in passing around each drum the cable is carried lengthwise in relation to the other drum an amount equal to the distance between the grooves on said drum, of a storing drum to receive and store the cable as it comes from the winding drums, and means for rotating the said drums, substantially as shown and described.

5. In a winding engine, the combination with the cable winding mechanism, of a separate storing drum, a friction driving device upon said storing drum, and means for operating it from some member of the cable winding mechanism, substantially as shown and described.

6. In a winding engine, the combination with two winding drums, having grooves upon their surfaces adapted to receive several coils of cable, of a storing drum for receiving and storing the cable as it comes from the winding drums, and means for rotating said storing drum at a variable speed so that it will just take up the slack whether winding at the center or outer edge of the drum, substantially as shown and described.

7. In a winding engine, the combination with two winding drums having grooves in their surfaces adapted to receive several coils of cable, of a separate storing drum to receive and store the cable as it leaves the winding drums, and means for rotating it from the winding drums, said means including a friction driving device, whereby the storing drum is rotated only sufficient to take up the slack whether winding at the center or edges of the drum, substantially as shown and described.

8. In a winding engine the combination with two winding drums having grooves in their surfaces adapted to receive several coils of cable, a separate storing drum and means for rotating the drums, with an overhauling drum for pulling out the main cable and means for operating it to wind up its cable when the main cable is running out, substantially as shown and described.

9. In a winding engine, the combination with the cable winding mechanism, a separate storing drum for receiving and storing the cable as it is wound in, and means for operating said mechanisms, of an overhauling drum and operating means so arranged as to wind its cable upon the overhauling drum when the winding drums are reversed, substantially as shown and described.

10. In a winding engine, the combination with the cable winding and storing mechanisms, and means for operating them in reverse directions, of an overhauling drum, a friction driving device for operating the same, and a brake whereby the rotation of the overhauling drum may be checked or stopped at will, substantially as shown and described.

11. In a winding engine, the combination with the cable winding mechanism, a storing drum to receive and store the cable as it is wound in, of an overhauling drum, a friction device which may be engaged with either the storing or overhauling drums and brakes upon each of said drums, substantially as shown and described.

12. In a winding engine, the combination with the cable winding mechanism, a storing drum to receive and store the cable as it is wound in, of an overhauling drum, a friction device which may be engaged with either the storing or overhauling drums, and brakes connected together so that they may be made to engage with either the storing or the overhauling drum but with only one at a time, substantially as shown and described.

13. In a winding engine, the combination with the main cable winding and storing mechanisms, and means for operating them, of an overhauling drum, and means for operating it so arranged as to wind its cable opposite to the main cable, and a brake on the overhauling drum, substantially as shown and described.

14. In a winding engine, the combination with the separate winding and storing drums, and means for operating them, of a separate overhauling drum, and means for operating it to wind its cable opposite to the main cable, and a brake on the overhauling drum, substantially as shown and described.

15. In a winding engine, the combination with the separate winding and storing drums, and means for operating them, with a separate overhauling drum, and means for opering it to wind its cable opposite to the main cable and brakes for the overhauling and storing drums connected together so that they may be applied to either drum, but to only one at a time, substantially as shown and described.

16. In a winding engine, the combination with the separate winding and storing drums, and means for operating them, an overhauling drum, and means for operating it so as to wind its cable opposite to the storing drum, a shaft extending across the face of both drums, a handle and brake shoes upon said shaft so placed that a movement of the handle in one direction will engage one drum and a movement in the other direction will engage the other drum, substantially as shown and described.

17. In a winding engine, the combination with the separate winding and storing drums, and means for operating them, of a movable cable guide between the winding and storing drums and operated from the storing drum, said guide receiving the cable from the winding drums and laying it regularly on the storing drum, substantially as shown and described.

18. In a winding engine, the combination with the separate winding and storing drums and means for operating them, of a cable laying mechanism receiving the cable as it passes from one of said drums to the other, means for transmitting motion from the storing drum to said cable laying mechanism, said cable laying mechanism consisting of a member traversing across the face of the drum, a pulley for holding the cable, and a swiveling connection between the pulley and said traversing member whereby the pulley may adjust itself to the cable at all points, substantially as shown and described.

19. In a winding engine, the combination with the separate winding and storing drums, and means for operating them, of a movable cable guide between the winding and storing drums and operated from the storing drum, said guide receiving the cable from the winding drums and laying it regularly on the storing drum, and a fixed cable guide to receive the cable as it comes from the storing drum and guide it upon the winding drums, substantially as shown and described.

20. In a winding engine, the combination with the winding drums, and means for operating them, a shaft, a friction device upon said shaft and means for operating it, separate storing and overhauling drums mounted loosely upon said shaft at opposite sides of said friction device, friction surfaces upon each of said drums adapted to be engaged by said friction device, and means for engaging the friction device with either drum at will, substantially as shown and described.

21. In a winding engine, the combination with the winding drums, and means for operating them, a shaft, a friction device upon said shaft and means for operating it, separate storing and overhauling drums mounted loosely upon said shaft at opposite sides of said friction device, friction surfaces upon each of said drums adapted to be engaged by said friction device, and means for engaging the friction device with either drum at will, and a brake mechanism adapted to engage either drum at will, substantially as shown and decribed.

22. In a winding engine, the combination of the winding drums, and means for operating them, a shaft, mounted in bearings so that it may be moved endwise, means for rotating it, a friction device fixed to said shaft, separate storing and overhauling drums mounted loosely upon said shaft upon opposite sides of said friction device, means for preventing endwise movements of said drums, and means for moving the shaft and friction device endwise to engage and rotate either drum at will, substantially as shown and described.

23. In a winding engine, the combination of the winding drums and means for operating them, a shaft mounted in bearings so that it may be moved endwise, means for rotating it, a friction device fixed to said shaft, separate storing and overhauling drums mounted loosely upon said shaft upon opposite sides of said friction device, means for preventing endwise movements of said drums and means for moving the shaft and friction device endwise to engage and rotate either drum at will, and a brake mechanism adapted to engage either drum at will, substantially as shown and described.

24. In a winding engine, the combination of the winding drums and means for operating them, a shaft mounted in bearings so that it may be moved endwise, means for rotating it, a friction device fixed to said shaft, separate storing and overhauling drums mounted loosely upon said shaft upon opposite sides of said friction device, means for preventing endwise movements of said drums, a collar having a flange at each end fixed to the shaft, a ring upon said collar between the flanges, a fixed nut and screw working therein and connected to said ring, whereby the shaft and its friction device may be moved and held into engagement with either of its drums, substantially as shown and described.

25. In a winding engine the combination of a power shaft and means for rotating it, a pinion upon said shaft which may be moved endwise thereon, a bull wheel, engaging with said power shaft pinion, a pinion connected to said bull wheel, winding drums, a gear connected to said winding drums and meshing with the bull wheel pinion and so placed that it will mesh with the power shaft pinion when it is moved upon its shaft, and means for shifting said power shaft pinion, substantially as shown and described.

26. In a winding engine the combination of a power shaft and means for rotating it, a pinion upon said shaft which may be moved endwise thereon, a bull wheel engaging with said power shaft pinion, a pinion connected to said bull wheel, winding drums, a gear connected to said winding drums and meshing with the bull wheel pinion and so placed that it will mesh with the power shaft pinion when it is moved upon its shaft, and means for shifting said power shaft pinion and a separate storing drum and means for rotating it, substantially as shown and described.

27. In a winding engine, the combination of a power shaft and means for rotating it, a pinion upon said shaft which may be moved endwise thereon, a bull wheel, engaging with said power shaft pinion, a pinion connected to said bull wheel, winding drums, a gear connected to said winding drums and meshing with the bull wheel pinion and so placed that it will mesh with the power shaft pinion when it is moved upon its shaft, and means for shifting said power shaft pinion, a drum shaft and means for rotating it a storing and overhauling drum mounted loosely thereon and means for rotating either from the shaft by a frictional connection, substantially as shown and described.

In testimony whereof we affix our signatures in presence of two witnesses.

HENRY L. REYNOLDS.
HENRY W. KETCHUM.

Witnesses:
S. T. KELSEY, Jr.,
L. H. WHEELER.